US011882910B2

(12) United States Patent
Stearns et al.

(10) Patent No.: US 11,882,910 B2
(45) Date of Patent: Jan. 30, 2024

(54) STORAGE DEVICE WITH HANDLE

(71) Applicant: Milwaukee Electric Tool Corporation, Brookfield, WI (US)

(72) Inventors: Michael Stearns, Milwaukee, WI (US); Christopher S. Hoppe, Midvale, UT (US); Aaron S. Blumenthal, Shorewood, WI (US); Scott M. Hangartner, Richfield, WI (US); Benjamin T. Jones, St. Francis, WI (US); Matthew A. Lownik, Wauwatosa, WI (US); George Barton, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/330,965

(22) Filed: Jun. 7, 2023

(65) Prior Publication Data

US 2023/0329409 A1 Oct. 19, 2023

Related U.S. Application Data

(63) Continuation of application No. 17/122,705, filed on Dec. 15, 2020, which is a continuation of application No. PCT/US2020/036381, filed on Jun. 5, 2020.

(Continued)

(51) Int. Cl.

| | |
|---|---|
| ***A45C 13/26*** | (2006.01) |
| ***B25H 3/02*** | (2006.01) |
| ***B65D 25/28*** | (2006.01) |

(52) U.S. Cl.

CPC ............... *A45C 13/26* (2013.01); *B25H 3/02* (2013.01); *B65D 25/2867* (2013.01)

(58) Field of Classification Search

CPC ....... A45C 13/26; B25H 3/02; B65D 25/2867

See application file for complete search history.

(56) References Cited

U.S. PATENT DOCUMENTS

| | | | | |
|---|---|---|---|---|
| 2,032,221 A * | 2/1936 | Myers | .................. | B65F 1/1623 220/756 |
| 2,510,754 A | 6/1950 | Norlin | | |

(Continued)

FOREIGN PATENT DOCUMENTS

| | | |
|---|---|---|
| CN | 207843034 | 9/2018 |
| CN | 208813770 | 5/2019 |

(Continued)

OTHER PUBLICATIONS

International Search Report and Written Opinion for International Application No. PCT/US2020/036381, dated Sep. 15, 2020, 11 pages.

*Primary Examiner* — Tri M Mai

(74) *Attorney, Agent, or Firm* — Reinhart Boerner Van Deuren s.c.

(57) ABSTRACT

Various carrying mechanisms to transport a storage device, container or unit are shown. The carrying mechanisms actuate between various positions that may interfere with opening a lid of the storage unit. Various configurations of the carrying mechanisms reduce their profile when in use. Also described are multi-segmented carrying mechanisms that provides a beneficial weight distribution while facilitating actuating the carrying mechanism between different positions.

3 Claims, 17 Drawing Sheets

Related U.S. Application Data

(60) Provisional application No. 62/858,651, filed on Jun. 7, 2019, provisional application No. 62/925,549, filed on Oct. 24, 2019.

(56) References Cited

U.S. PATENT DOCUMENTS

| | | | | |
|---|---|---|---|---|
| 3,057,508 | A * | 10/1962 | Kimbrough, Jr. | A45C 11/20 220/322 |
| 3,522,955 | A | 8/1970 | Warner | |
| 4,476,994 | A | 10/1984 | Hope et al. | |
| 4,938,359 | A * | 7/1990 | Bernstein | B65D 1/243 206/203 |
| 5,044,513 | A | 9/1991 | Van Berne | |
| 5,085,317 | A * | 2/1992 | Jensen | B44D 3/121 206/229 |
| 5,249,438 | A | 10/1993 | Rhaney et al. | |
| 5,447,252 | A * | 9/1995 | Ward | B65D 81/3816 220/756 |
| 5,699,925 | A * | 12/1997 | Petruzzi | B65D 21/0204 206/508 |
| 5,715,968 | A | 2/1998 | Fink et al. | |
| 5,988,658 | A | 11/1999 | Ritchie et al. | |
| 6,176,559 | B1 | 1/2001 | Tiramani et al. | |
| 6,347,847 | B1 | 2/2002 | Tiramani et al. | |
| 6,601,930 | B2 | 8/2003 | Tiramani et al. | |
| 7,503,569 | B2 | 3/2009 | Duvigneau | |
| 7,845,653 | B2 | 12/2010 | Katz | |
| 7,854,321 | B2 | 12/2010 | Twig et al. | |
| 7,938,412 | B2 | 5/2011 | Katz | |
| 8,132,819 | B2 | 3/2012 | Landau et al. | |
| 8,183,702 | B2 | 5/2012 | Hiranuma et al. | |
| 9,469,024 | B2 * | 10/2016 | Bensman | B65D 25/28 |
| 9,550,605 | B1 | 1/2017 | Summers | |
| 9,566,704 | B1 | 2/2017 | Stoikos et al. | |
| 9,661,905 | B2 | 5/2017 | Donnell et al. | |
| 10,160,471 | B2 | 12/2018 | Yahav et al. | |
| 10,272,934 | B2 | 4/2019 | Defrancia | |
| 10,583,962 | B2 | 5/2020 | Brunner et al. | |
| D917,977 | S | 5/2021 | Brunner et al. | |
| 2002/0163284 | A1 | 11/2002 | Levy et al. | |
| 2005/0178770 | A1 | 8/2005 | Hase et al. | |
| 2005/0199459 | A1 | 9/2005 | Harvey | |
| 2006/0254946 | A1 | 11/2006 | Becklin | |
| 2007/0194543 | A1 | 8/2007 | Duvigneau | |
| 2014/0197059 | A1 | 7/2014 | Evans et al. | |
| 2014/0262885 | A1 | 9/2014 | Green et al. | |
| 2017/0080311 | A1 | 3/2017 | Cain | |
| 2017/0166352 | A1 * | 6/2017 | Hoppe | B25H 3/022 |
| 2019/0008249 | A1 | 1/2019 | O' Donnell et al. | |
| 2019/0225371 | A1 | 7/2019 | Hoppe et al. | |
| 2019/0248397 | A1 | 8/2019 | Defrancia | |
| 2020/0147781 | A1 | 5/2020 | Squiers et al. | |
| 2020/0165036 | A1 | 5/2020 | Squiers et al. | |

FOREIGN PATENT DOCUMENTS

| | | | |
|---|---|---|---|
| JP | 06-076064 | U | 10/1994 |
| JP | 2016-203981 | A | 12/2016 |
| KR | 10-0290307 | B1 | 6/2001 |
| WO | WO14125484 | | 8/2014 |
| WO | WO17149539 | | 9/2017 |

* cited by examiner

STORAGE DEVICE WITH HANDLE

CROSS-REFERENCE TO RELATED PATENT APPLICATIONS

The present application is a continuation of U.S. patent application Ser. No. 17/122,705, filed Dec. 15, 2020, which is continuation of International Patent Application No. PCT/US2020/036381, filed Jun. 5, 2020, which claims the benefit of and priority to U.S. Provisional Application No. 62/858,651, filed Jun. 7, 2019, and U.S. Provisional Application No. 62/925,549, filed Oct. 24, 2019, each of which are incorporated herein by reference in their entireties.

BACKGROUND OF THE INVENTION

The present disclosure relates generally to the field of storage units. The present disclosure relates specifically to a storage unit with a handle coupled to the housing of the storage unit.

Storage units are often used to transport tools and tool accessories. Some storage units are designed to be easily transported, some are designed to be stationary, and some are designed with either possibility in mind. Storage units include walls that may be either soft-sided (e.g., a strong fabric) or hard-sided (e.g., plastic).

SUMMARY OF THE INVENTION

In one embodiment, a storage device, container or unit includes a housing with an internal compartment, a bottom surface of the housing, a lid pivotally coupled to the housing such that the lid is pivotable between a fully open position and a closed position in which the lid covers the internal compartment, and an extendable handle rotatably coupled to the housing such that the handle rotates about an axis with respect to the housing. The bottom surface of the housing includes coupling components that couple the bottom surface of the storage unit to a top surface of a second storage unit. The handle actuates between a fully extended position and a fully retracted position in which a distal end of the handle is closer to the axis when the handle is in the fully retracted position than when the handle is in the fully extended position. When the handle is in the fully retracted position the handle interferes with pivoting the lid from the closed position to the fully open position.

In another embodiment, a storage unit includes a housing, an elongate recess defined within the housing, the elongate recess including a first portion and a second portion, a bottom surface defined by the housing, the bottom surface including coupling components that couple the bottom surface of the storage unit to a top surface of a second storage unit, a handle including a first end, and a protrusion extending from the first end. The protrusion engages with the elongate recess and is moveable within the elongate recess from the first portion to the second portion. When the protrusion is positioned within the first portion, the handle is pivotal with respect to the housing over a first range of rotation. When the protrusion is positioned within the second portion, the handle is pivotal with respect to the housing over a second range of rotation that is smaller than the first range of rotation.

In another embodiment, a storage unit includes a housing having a bottom wall, first lateral wall and an opposing second lateral wall. The first lateral wall and the second lateral wall extend from the bottom wall. The housing also includes a bottom surface defined by the bottom wall, the bottom surface including coupling components that couple the bottom surface of the storage unit to a top surface of a second storage unit. The housing also includes first, second, third, fourth, fifth, and sixth handle segments. The first handle segment is rotatably coupled to the first lateral wall and rotates around a first axis with respect to the first lateral wall. The second handle segment is rotatably coupled to the first lateral wall and rotates around a second axis with respect to the first lateral wall. The third handle segment is rotatably coupled to the first handle segment and to the second handle segment. The third handle segment rotates around a third axis with respect to the first handle segment, and the third handle segment rotates around a fourth axis with respect to the second handle segment. The first axis, the second axis, the third axis and the fourth axis are distinct from each other. The fourth handle segment is rotatably coupled to the second lateral wall and rotates around the first axis with respect to the second lateral wall. The fifth handle segment is rotatably coupled to the second lateral wall and rotates around the second axis with respect to the second lateral wall. The sixth handle segment is rotatably coupled to the fourth handle segment and to the fifth handle segment. The sixth handle segment rotates around the third axis with respect to the fourth handle segment, and the sixth handle segment rotates around the fourth axis with respect to the fifth handle segment.

In another embodiment, a storage device, container or unit includes a housing, a lid, and an extendable handle. The lid is pivotally coupled to the housing. The lid and the housing cooperatively define an interior when the lid is in a closed position. The handle is pivotally coupled to the housing. The handle defines a resting orientation in which the handle interferes with the lid being opened when the handle is retracted and in the resting orientation.

In a specific embodiment, the housing includes a bottom wall and sidewalls extending upward away from the bottom wall. The sidewalls and bottom wall include inner surfaces defining an interior container space. In such embodiments, the handle is coupled to at least one of the sidewalls.

In another embodiment, a storage unit includes a housing, a lid, and a handle. The lid is pivotally coupled to the housing. The lid and the housing cooperatively define an interior when the lid is in a closed position. At a first end of the handle is an elongate aperture that engages with a protrusion extending from the housing. Depending on the positioning of the handle, the opposite end of handle interferes with the lid opening. In specific embodiments, the handle is pivotable around the protrusion between a first position in which the handle blocks the lid from opening and a second position in which the handle does not block the lid from opening.

In another embodiment, a storage unit includes a housing, a lid, and a handle. The lid and the housing cooperatively define an interior when the lid is in a closed position. The housing defines an elongate slot that includes a pivoting portion and a restricted pivoting portion. The lid is pivotally coupled to the housing. The handle includes a first end from which a protrusion extends. The protrusion extends along the axis about which the handle rotates with respect to the housing. The protrusion engages the slot so that the handle pivots with respect to the housing when the protrusion is located within the pivoting portion of the slot and the handle has a reduced pivoting range (e.g., the handle is restricted from pivoting) when the protrusion is located within the remaining portion of the slot.

In another embodiment, a storage unit includes a housing, a lid pivotally coupled to the housing, and a handle. The housing includes a bottom wall and one or more lateral walls that extend from the bottom wall, including a first lateral wall on a first side of the housing and a second lateral wall on a second side of the housing that is opposite the first side.

On the first side of the housing, a first handle segment is pivotally coupled to the first lateral wall at a first axis and a second handle segment is pivotally coupled to the first lateral wall at a second axis. A third handle segment is pivotally coupled to both the first handle at a third axis and the second handle at a fourth axis. The fourth axis is between the third axis and the middle of the third handle segment.

On the second side of the housing, a fourth handle segment is pivotally coupled to the second lateral wall at a fifth axis, a fifth handle segment is pivotally coupled to the second lateral wall at a sixth axis, and a sixth handle segment is pivotally coupled to both the fourth handle at a seventh axis and the fifth handle at an eighth axis. The eighth axis is between the seventh axis and the middle of the sixth handle segment. The handle segments on each side of the housing are coupled together via a lateral handle segment.

The handle segments can be actuated between a carrying position and an open position. In the carrying position, the lateral handle segment is positioned above the lid, and in the open position, the handle segments are positioned out of the movement path of the lid, allowing the lid to open with respect to the housing.

In a specific embodiment, the handle segments on each side of the housing generally mirror each other so that the first axis is aligned with the fifth axis, the second axis is aligned with the sixth axis, the third axis is aligned with the seventh axis, and the fourth axis is aligned with the eighth axis. In a specific embodiment, the first axis where the first handle is pivotally coupled to the housing is higher than the second axis where the second handle is pivotally coupled to the housing.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding, and are incorporated in, and constitute a part of this specification. The drawings illustrate one or more embodiments and, together with the description, serve to explain principles and operation of the various embodiments.

DETAILED DESCRIPTION

Figure 1:
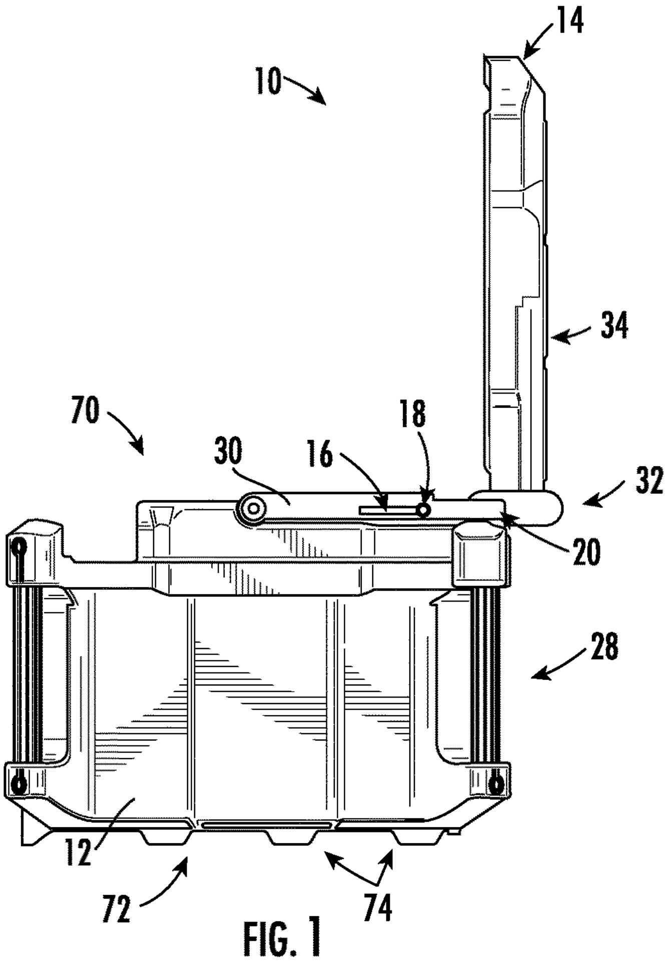
FIG. 1 is a side view of a storage unit, according to an embodiment.

Referring generally to the figures, various embodiments of a stackable storage device, container or unit are shown. Described herein are various embodiments of stackable and movable storage units, such as tool storage units. One or more of the units are configured to selectively couple and decouple with other units. The unit(s) include a handle coupled to the housing of the storage unit. The handle is used to carry the storage unit and is adjustable to a resting position that reduces the profile of the handle and permits the storage unit to cooperatively engage other storage units.

Referring to FIGS. 1-7, a storage container or device, such as tool storage unit 10, is shown according to an exemplary embodiment. Tool storage unit 10 includes housing 12, lid 14, and a component to carry storage unit 10, shown as telescoping handle 30. Lid 14 is pivotally coupled to housing 12 such that lid 14 is pivotable between a fully open position (shown in FIG. 1) and a closed position (FIG. 2) covering an internal storage area, shown as internal compartment Lid 14 pivots with respect to housing 12 around axis 22.

With reference to at least FIG. 1, in one embodiment, the handle 30 is rotatably attached to the base (e.g., housing 12) and not to the lid 14. Handle 30 rotates with respect to housing 12 around axis 22. In one embodiment, handle 30 is extendable, such as via longitudinal slot 16 and pin 18.

Handle 30 actuates between a fully extended position (best shown in FIG. 1) and a fully retracted position (FIG. 2) in which a distal end 32 of the handle 30 is closer to the axis 22 when handle 30 is in the retracted position than when handle 30 is in the extended position. Handle 30, when in the fully retracted position, is positionable to partially rest on top surface 34 of lid 14. In one embodiment, handle 30 is positionable to not extend rearward past a rear surface 28 of the housing 12. By limiting the positions that handle 30 may assume, the unit 10 can be conveniently attached to modular storage that has space restrictions (e.g., this unit 10 is attached to another rolling box with a telescoping handle that extends parallel and close to the back wall of this unit this unit 10 is connected to a plate that is pushed up against the wall of a van or garage).

In one embodiment, the handle 30 rests on the lid 14 when the lid 14 is closed preventing and/or interfering with the lid 14 opening from the closed position to the open position until the handle 30 is moved out of the way. In this embodiment, the handle 30 is telescoping (e.g., via a slot 16 with a pin 18 and the handle 30 is spring loaded). In this embodiment, when the user lifts the lid 14, the spring causes the handle 30 to extend and pushes the handle 30 out of the way of lid 14 and into an extended position to allow the lid 14 to rotate into an open position. In a specific embodiment, when handle 30 is in the fully extended position, distal end 32 of handle 30 is not positionable to interface against top surface 34 of lid 14.

Housing 12 defines bottom surface 72, which includes coupling components 74. In specific embodiments, coupling components 74 utilized in the units (e.g., tool storage units) discussed herein are described in International Patent Application No. PCT/US2018/044629, which is incorporated herein by reference in its entirety.

When handle 30 is retracted and in a resting orientation (best-shown FIG. 2), end 32 of handle 30 interferes with the ability of lid 14 to rotate from the closed position toward the opened position. When end 32 is extended past rear surface 28 of housing 12, lid 14 rotates from the closed position (best-shown FIG. 3).

Figure 2:
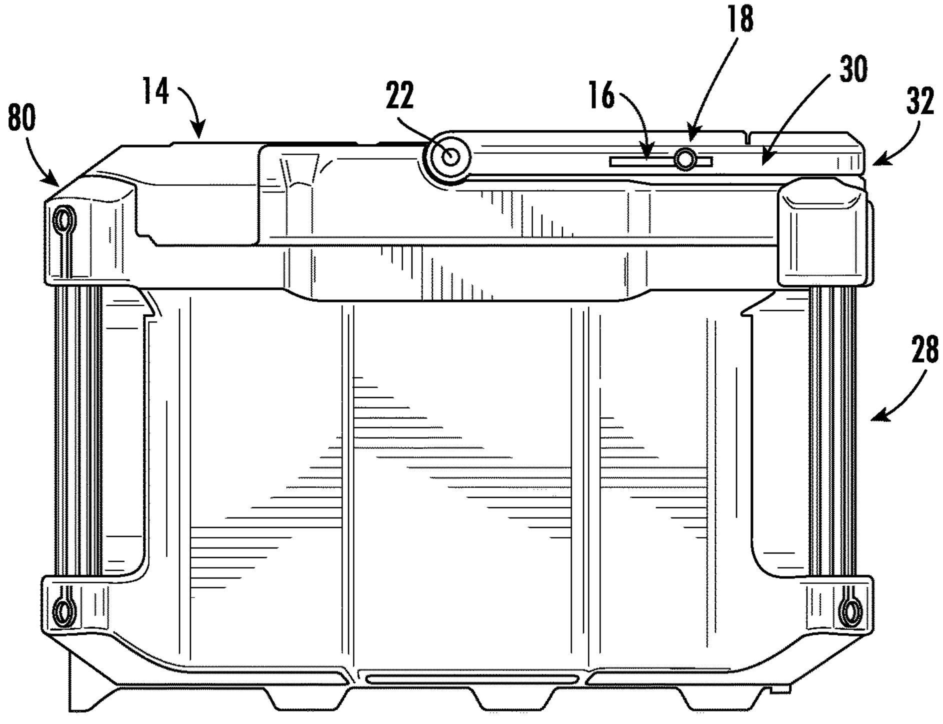
FIG. 2 is a side view of the storage unit of FIG. 1, according to an embodiment.
Figure 3:
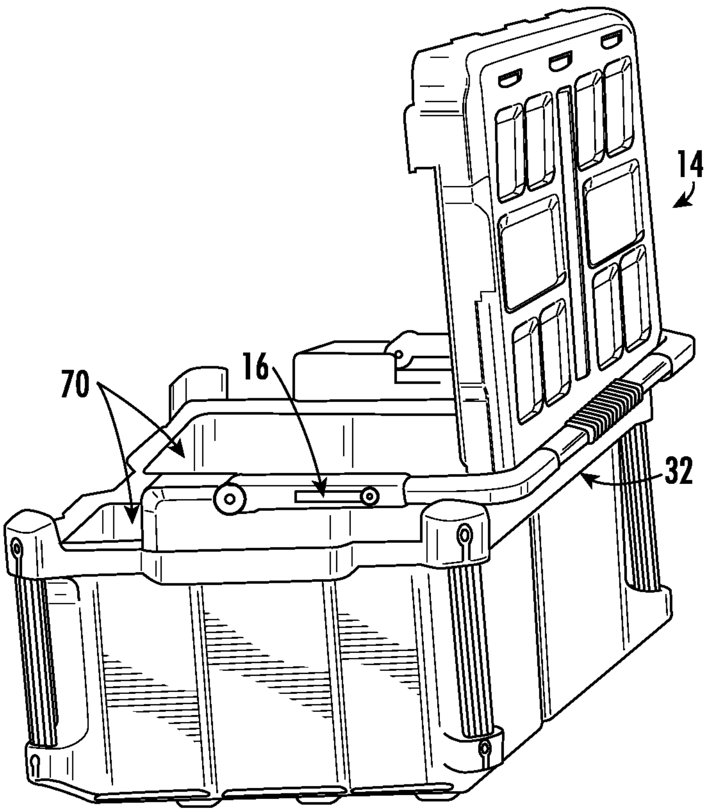
FIG. 3 is a perspective view of the storage unit of FIG. 1, according to an embodiment.

In one embodiment, top surface 24 of handle 30 extends past top surface 34 of lid 14 when handle 30 is in a resting position (best-shown FIG. 2). In an alternate embodiment, top surface 24 of handle 30 and top surface 34 of lid 14 are coplanar when handle 30 is in a resting position.

Figure 4:
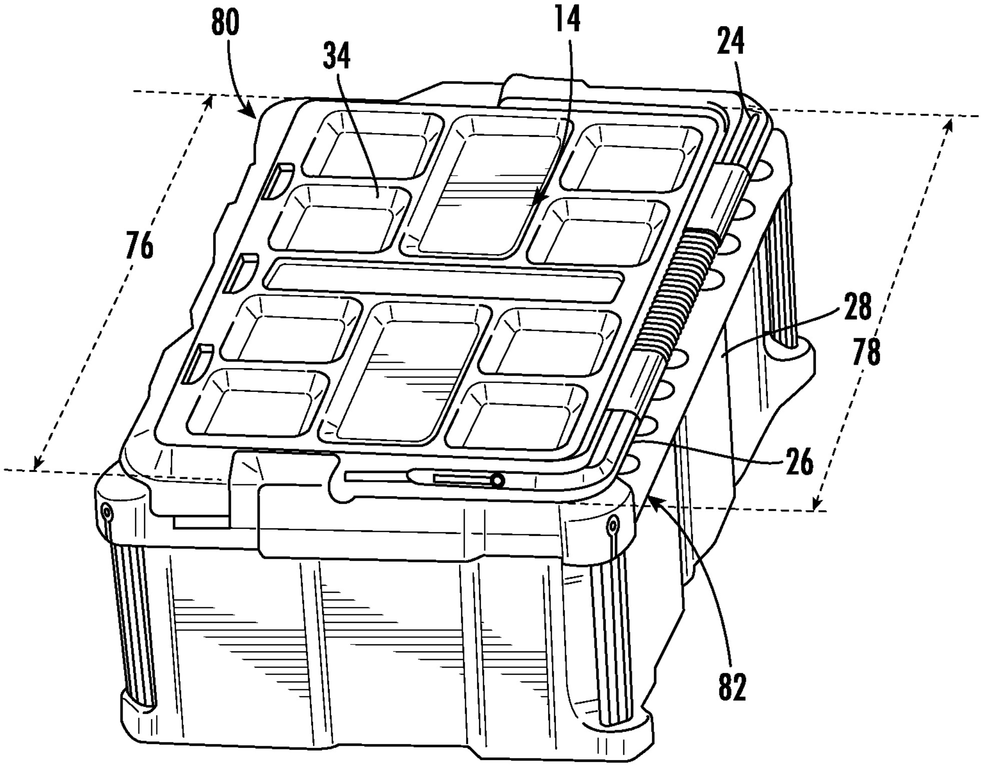
FIG. 4 is a perspective view of the storage unit of FIG. 1, according to an embodiment.

With reference to at least FIG. 4, handle 30 is coupled to housing 12. In a specific embodiment when lid 14 is in the closed position, a front surface 80 of lid 14 defines a first width 76 and rear 82 surface of lid 14 defines a second width 78 that is smaller than first width 76. The increased width 76 at the front portion of lid 14 increases the area of the lid 14 and, therefore, as much space inside of the unit 10 as possible can be utilized without growing the overall dimensions of the unit 10. In a specific embodiment, when lid 14 is in the closed position, handle 30 is positionable such that handle 30 does not extend above top surface 34 of lid 14.

In an alternative embodiment, handle 30 is coupled to housing 12 at a position that is lower than shown in FIG. 4. This alternate position for coupling handle 30 to housing 12 permits lid 14 to have the same width at the front and rear portions of lid 14.

Figure 5:
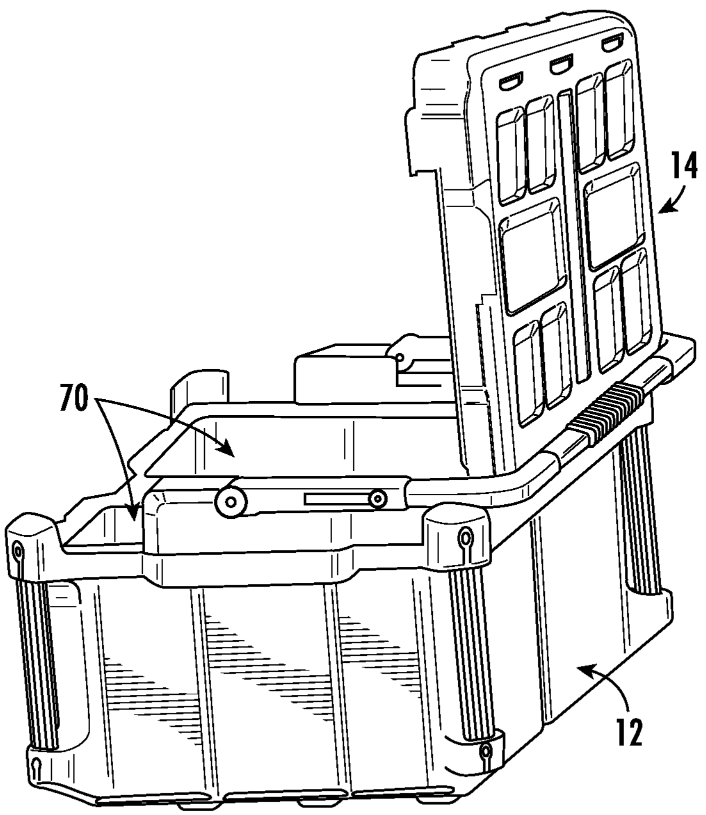
FIG. 5 is a perspective view of the storage unit of FIG. 1, according to an embodiment.
Figure 6:
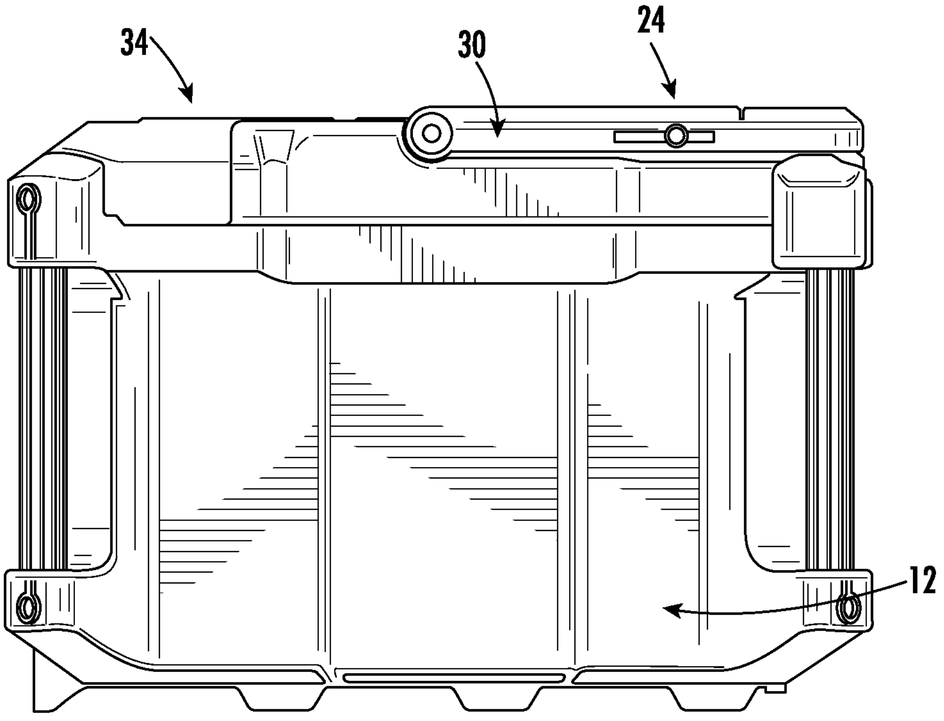
FIG. 6 is a side view of the storage unit of FIG. 1, according to an embodiment.
Figure 7:
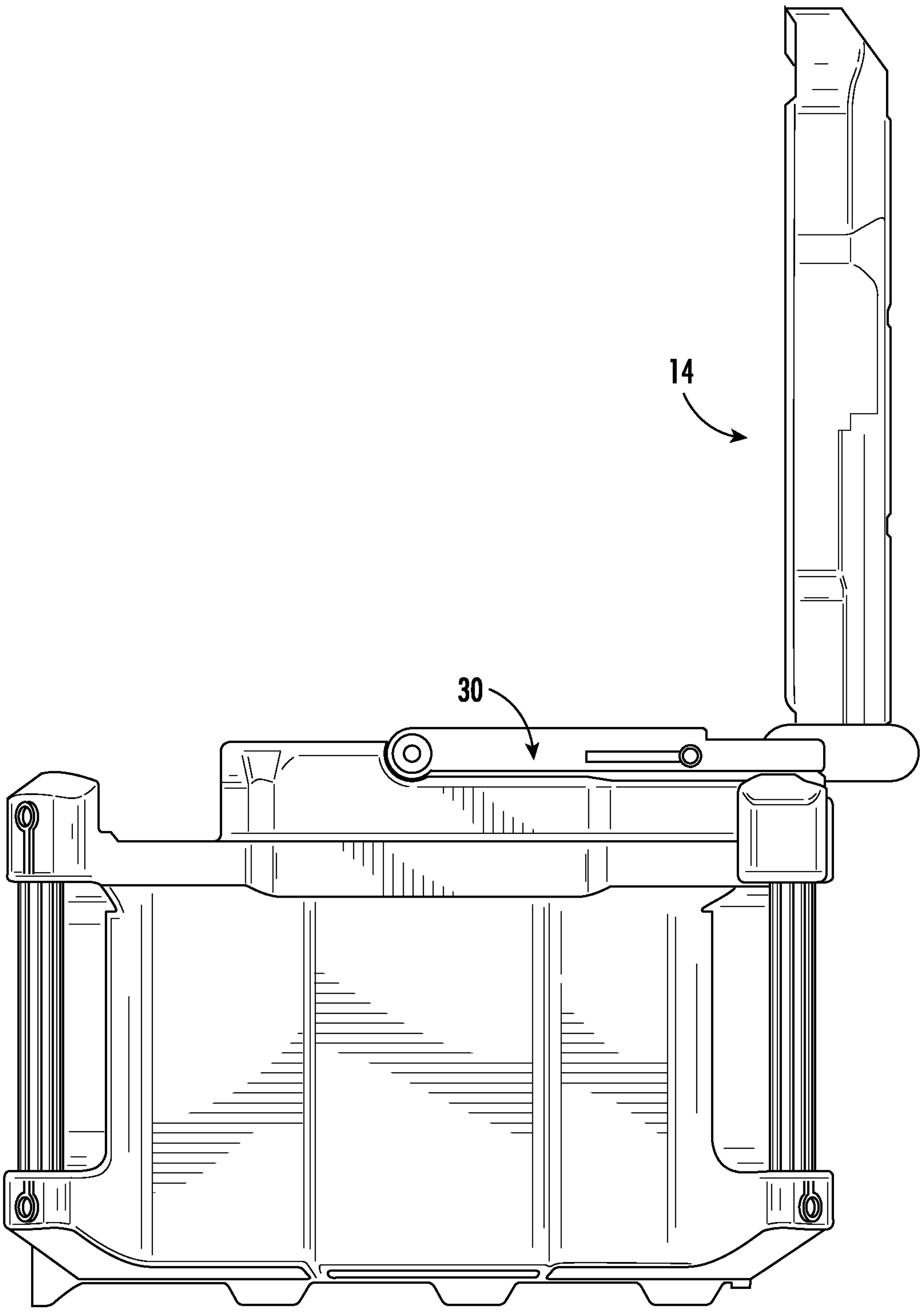
FIG. 7 is a side view of the storage unit of FIG. 1, according to an embodiment.

With reference to FIGS. 5-7, FIG. 5 is a perspective view, FIG. 6 is a view of storage unit 10 in the closed position, and FIG. 7 is a view of storage unit 10 in the open position. Lid 14 pivotally opens with respect to housing 12 to expose internal compartments 70.

When handle 30 is retracted and in the lowered position, handle 30 defines peripheral surface 26 that faces away from the front of storage unit 10 (best shown FIG. 4). In one embodiment, when handle 30 is retracted and in the lowered position, lateral peripheral surface 26 of handle 30 does not extend past rear surface 28 of housing 12. This reduced lateral footprint for handle 30 reduces the space required to store storage unit 10. In addition, the sides of lid 14 near the rear of storage unit 10 are not as wide as the forward sides of lid 14 near the front. This aspect permits handle 30 to rest against housing 12 next to lid 14 which in turn also provides for a reduced lateral footprint of the storage unit.

Turning to FIGS. 8-14, depicted therein is another embodiment of storage unit 10 including a device to carry the storage unit 10, shown as a slotted handle 44. Pin 38 protrudes from housing 12 and defines axis 22 about which handle 44 rotates. When handle 44 is positioned such that pin 38 is located at second end 42 of longitudinal slot 36 (FIGS. 9, 12, and 13), end 32 of handle 44 interferes with lid 14 rotating from the closed position. When the position of handle 44 is adjusted such that pin 38 is located at first end 40 of longitudinal slot 36 (FIGS. 10 and 14), end 32 of handle 44 no longer interferes with lid 14 rotating from the closed position.

Figure 8:
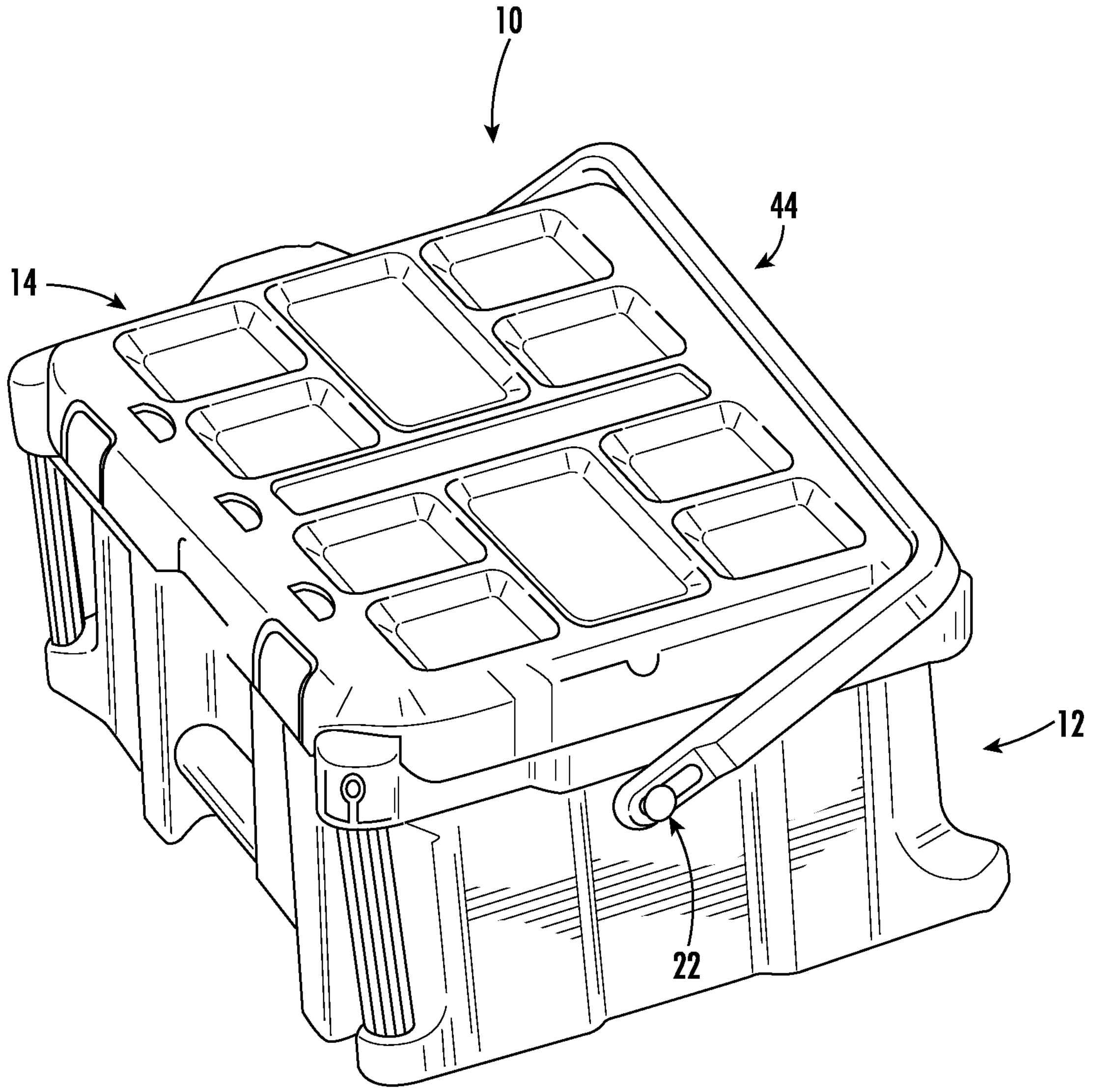
FIG. 8 is a perspective view of a storage unit, according to an embodiment.
Figure 9:
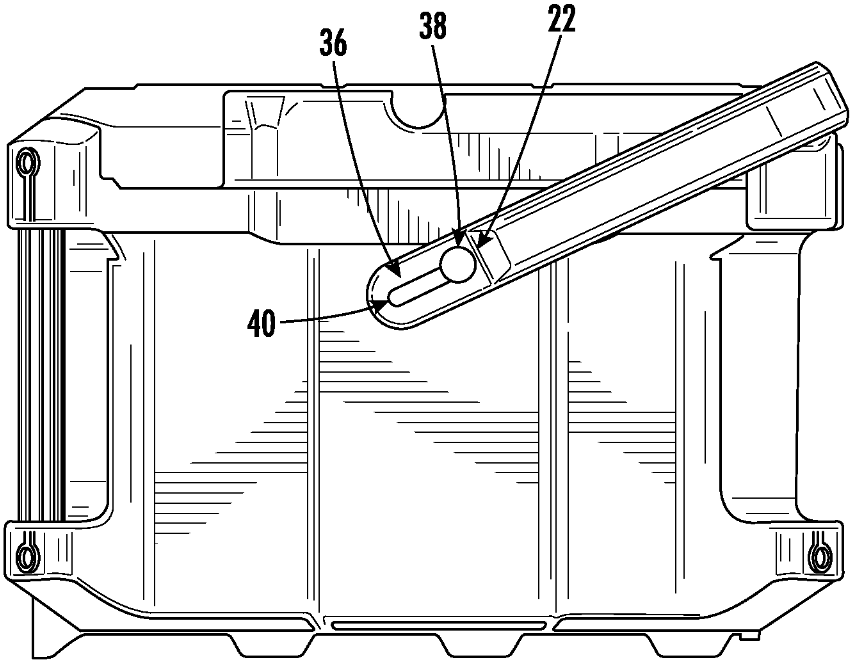
FIG. 9 is a side view of the storage unit of FIG. 8, according to an embodiment.
Figure 10:
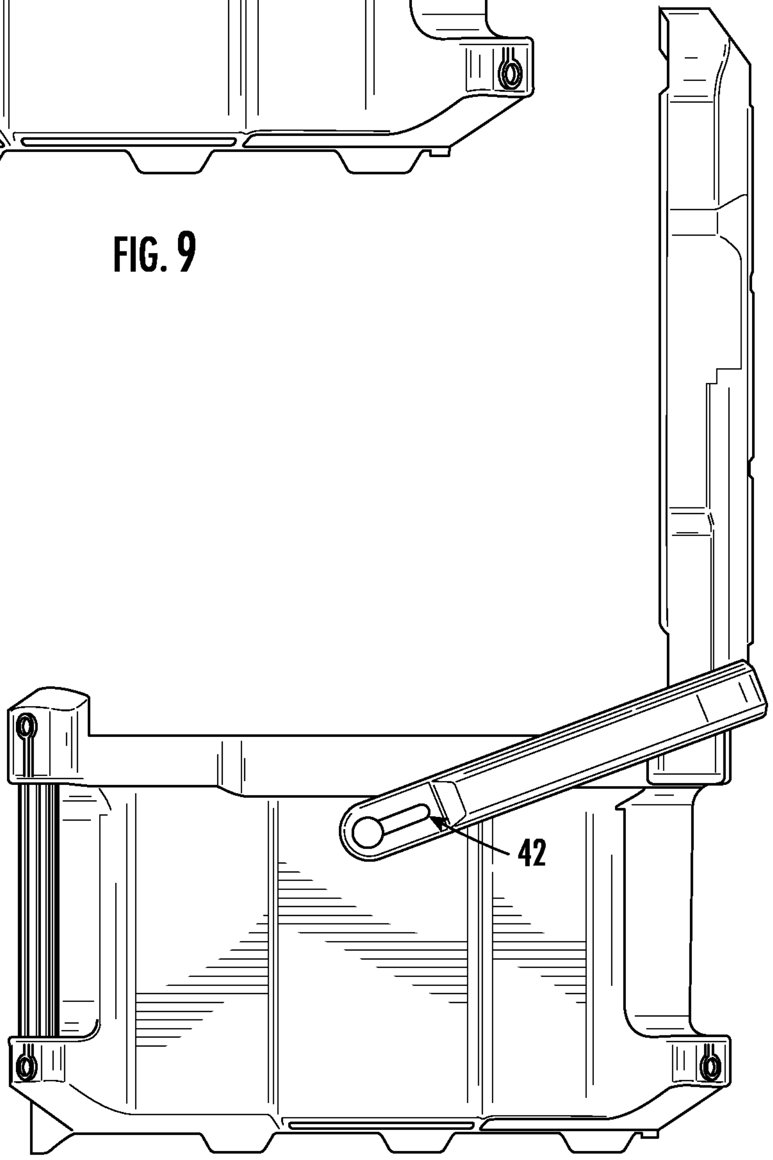
FIG. 10 is a side view of the storage unit of FIG. 8, according to an embodiment.
Figure 11:
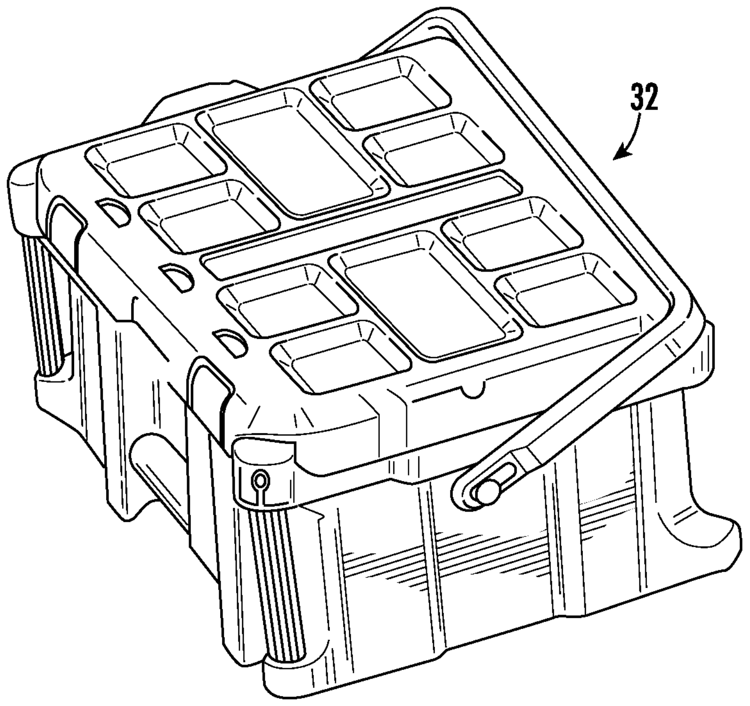
FIG. 11 is a perspective view of the storage unit of FIG. 8, according to an embodiment.

With reference to at least FIG. 8, in one embodiment when the lid 14 is lifted, the handle 44 interferes with the lid 14 opening. To pivot handle 44 out of the way, the handle 44 includes a slot 36 that receives a pin 38 that is connected to the base. When in the closed position, the pin 38 is at one end of the slot 36, but when in the open position, the pin 38 is at the other (bottom) end of the slot 36.

Figure 12:
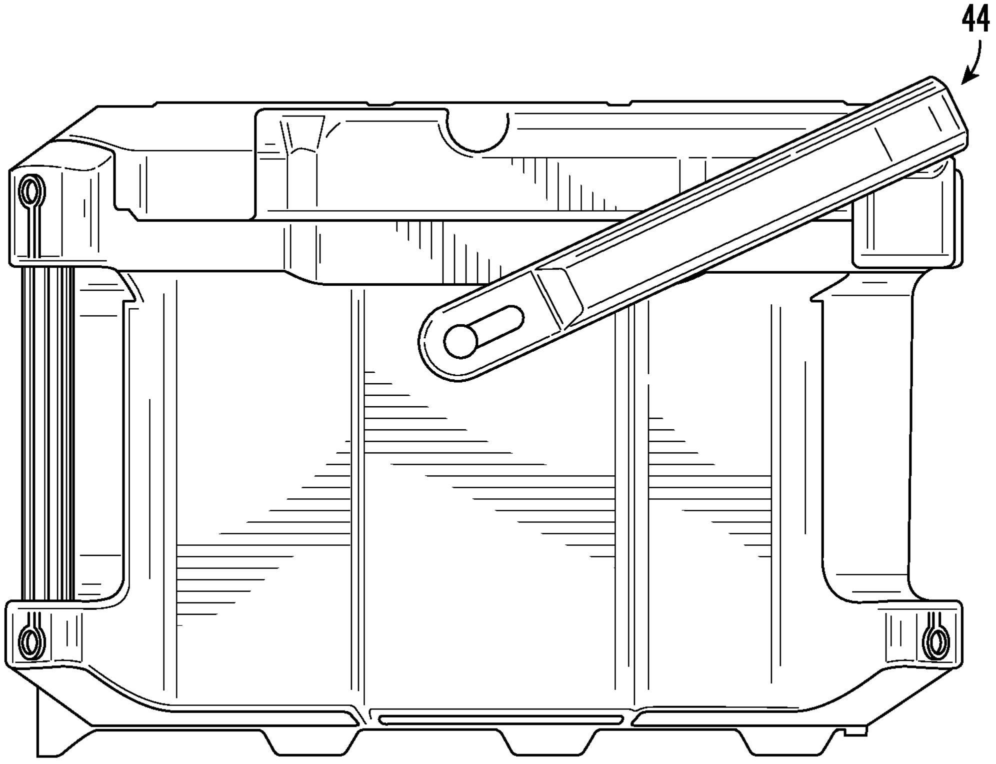
FIG. 12 is a perspective view of the storage unit of FIG. 8, according to an embodiment.
Figure 13:
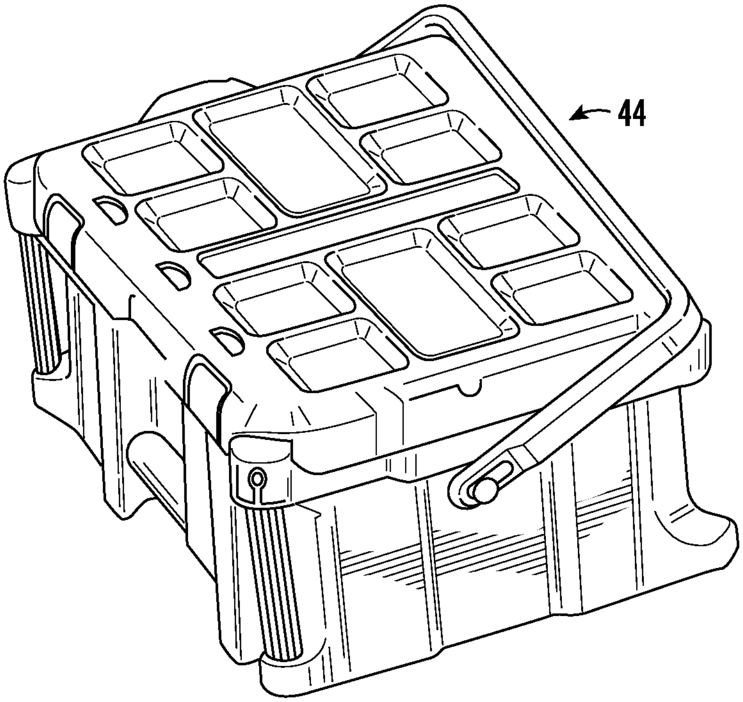
FIG. 13 is a side view of the storage unit of FIG. 8, according to an embodiment.
Figure 14:
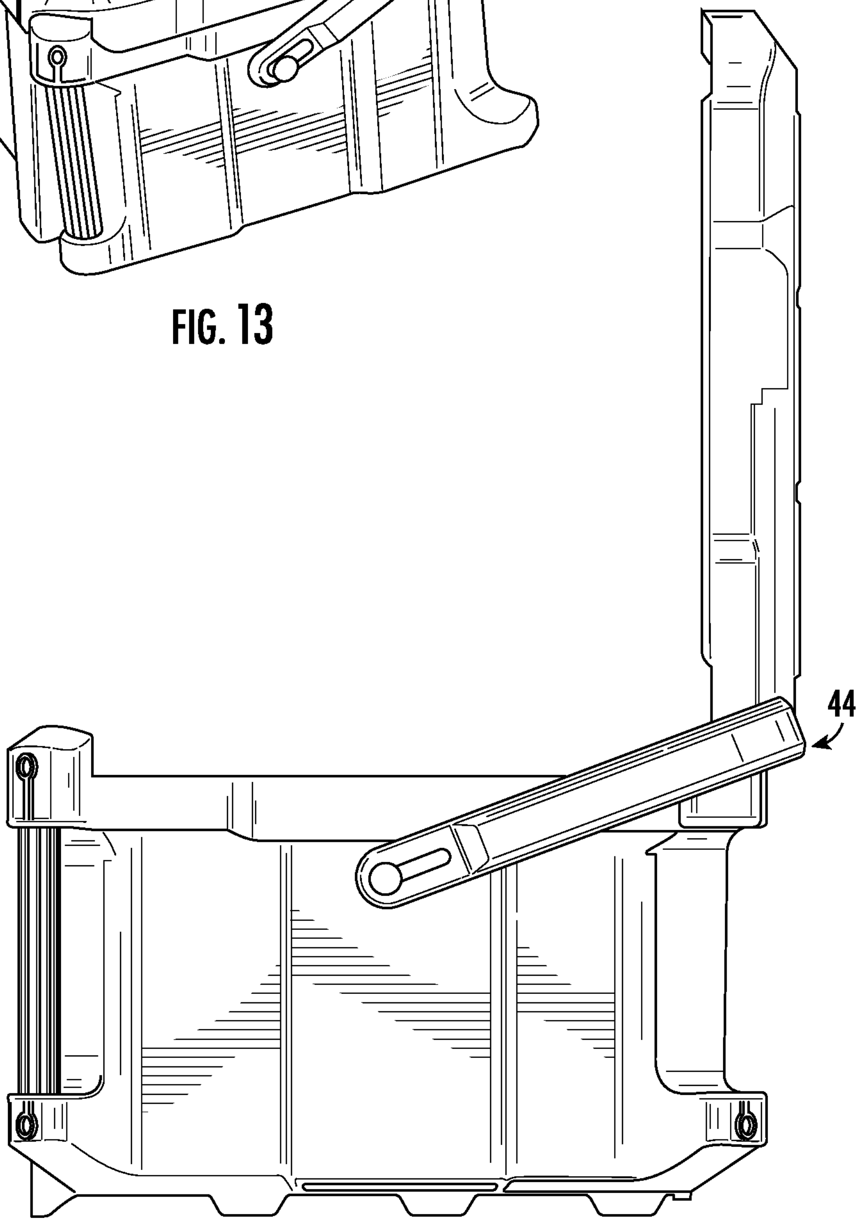
FIG. 14 is a side view of the storage unit of FIG. 8, according to an embodiment.

With reference to FIGS. 12-14, FIG. 12 is a side view of storage unit 10, FIG. 13 is a view of storage unit 10 in the closed position, and FIG. 14 is a view of storage unit 10 in the open position.

Turning to FIGS. 15-24, various aspects of storage unit 210 are shown. Unit 210 is similar to unit 10 except for the differences discussed herein. Housing 212 defines a recess, shown as check slot 246. A protrusion, shown as pin 248, extends from end 232 of handle 230 and engages with slot 246. Pin 248 extends length 256 along plane 254, plane 254 being defined by pin 248. Pin 248 interfaces with and slides along slot 246. Slot 246 includes taller portion 250 and shorter portion 252. In various embodiments both sidewalls of housing 212 define slots 246, which are symmetrical with respect to each other.

Figure 15:
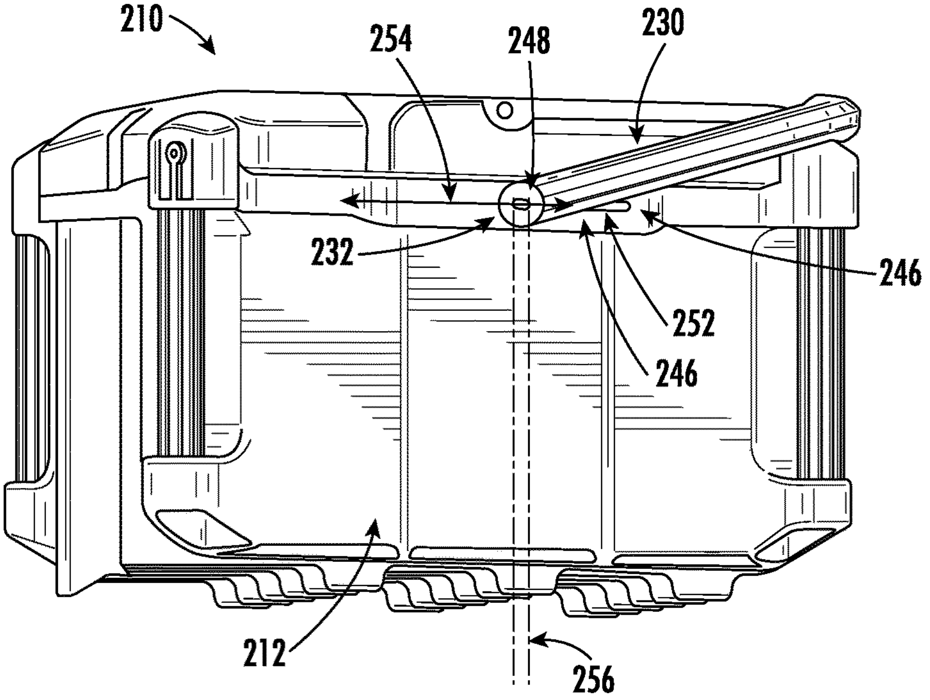
FIG. 15 is a side view of a storage unit, according to an embodiment.
Figure 16:
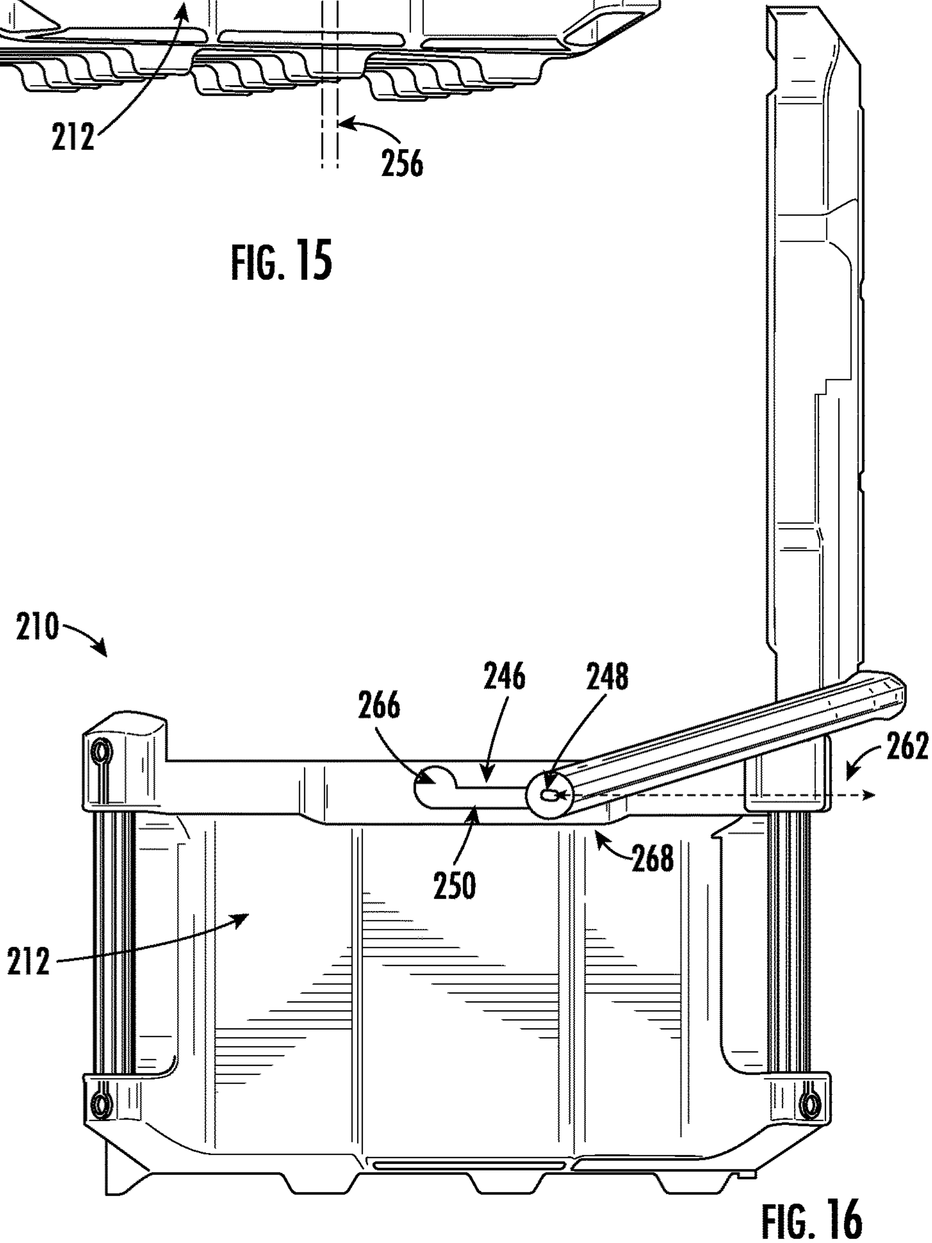
FIG. 16 is a side view of the storage unit of FIG. 15, according to an embodiment.

With reference to at least FIGS. 15 and 16, in one embodiment slot 246 is in housing 212 of unit 210 and the pin 248 protrudes from in the handle 230. The pin 248 is oblong. The slot 246 is narrow along the majority of the length of the slot 246, but at one end 266 has a larger height. Thus, at the shorter portion 252, the pin 248 slides along the length when the oblong pin 48 is aligned with the slot 246 (e.g., the handle 230 slides along the length of the slot 246 between taller portion 250 and shorter portion 252 when the handle 230 is in the backwards position). However, at the taller portion 250 of the slot 246, the handle 230 is free to rotate. The taller portion 250 of the slot 246 is located at or near the center of housing 212 to facilitate carrying of unit 210 via the handle 230 and not allow the handle 230 to slide along the slot 246 when the handle 230 is in the upwards/carrying position.

Figure 17:
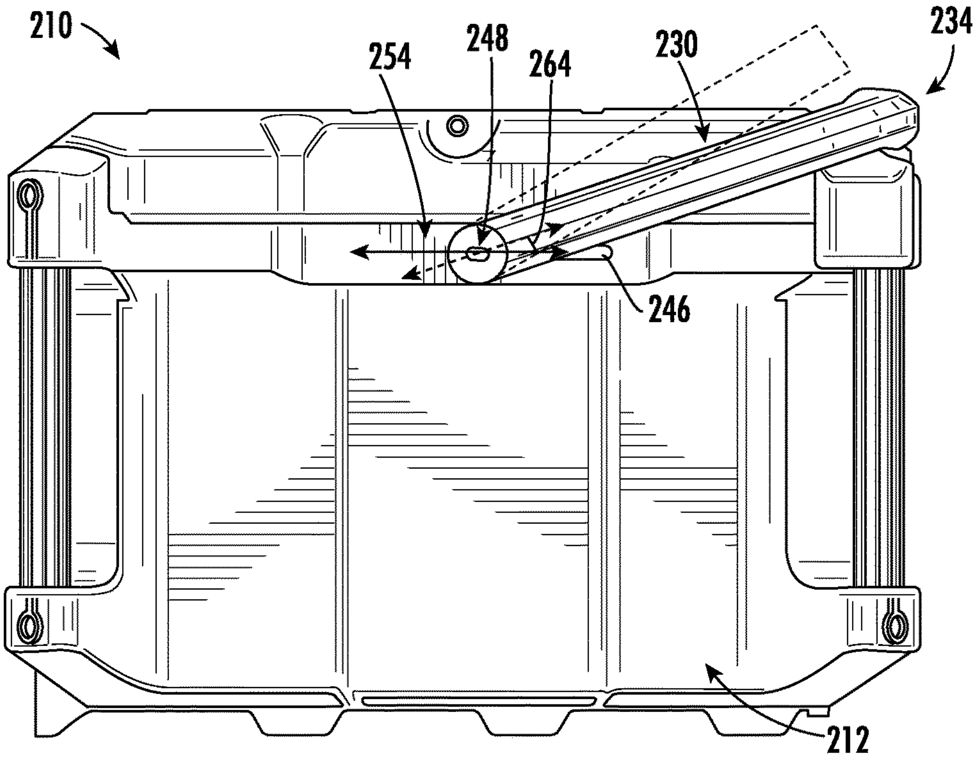
FIG. 17 is a side view of the storage unit of FIG. 15, according to an embodiment.
Figure 18:
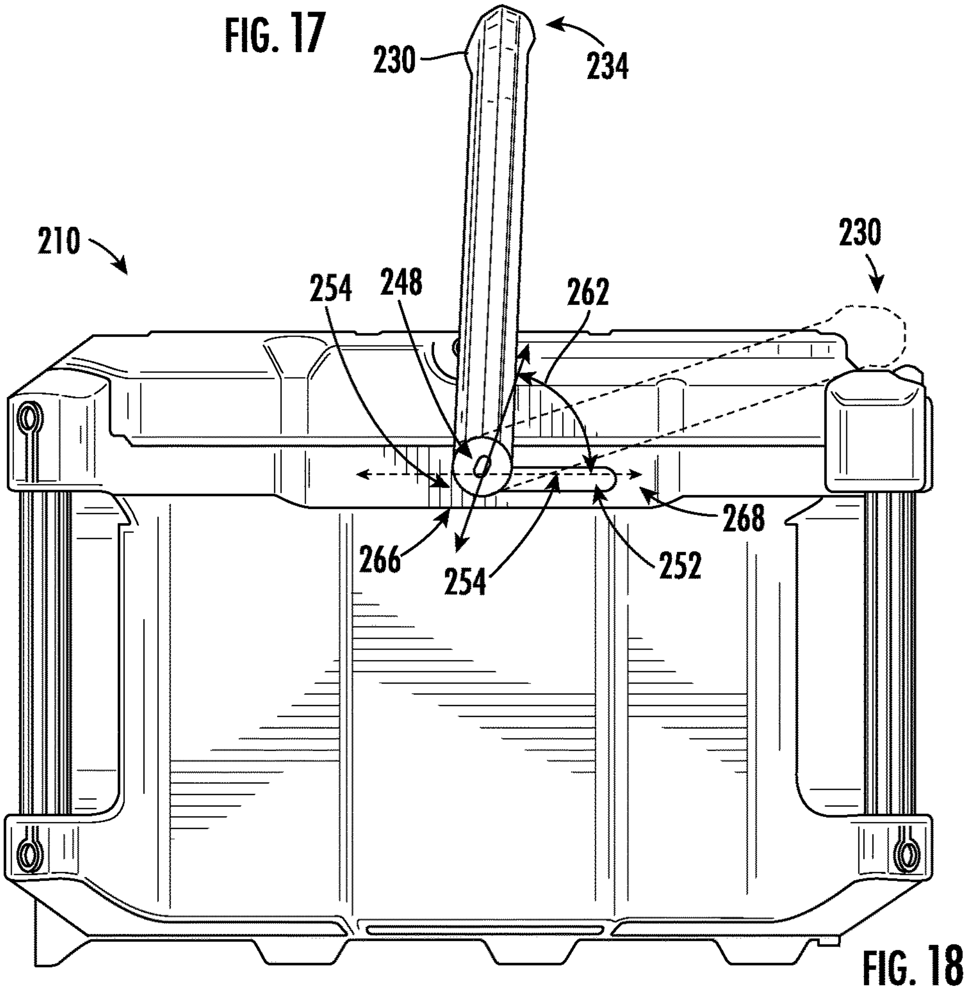
FIG. 18 is a side view of the storage unit of FIG. 15, according to an embodiment.
Figure 19:
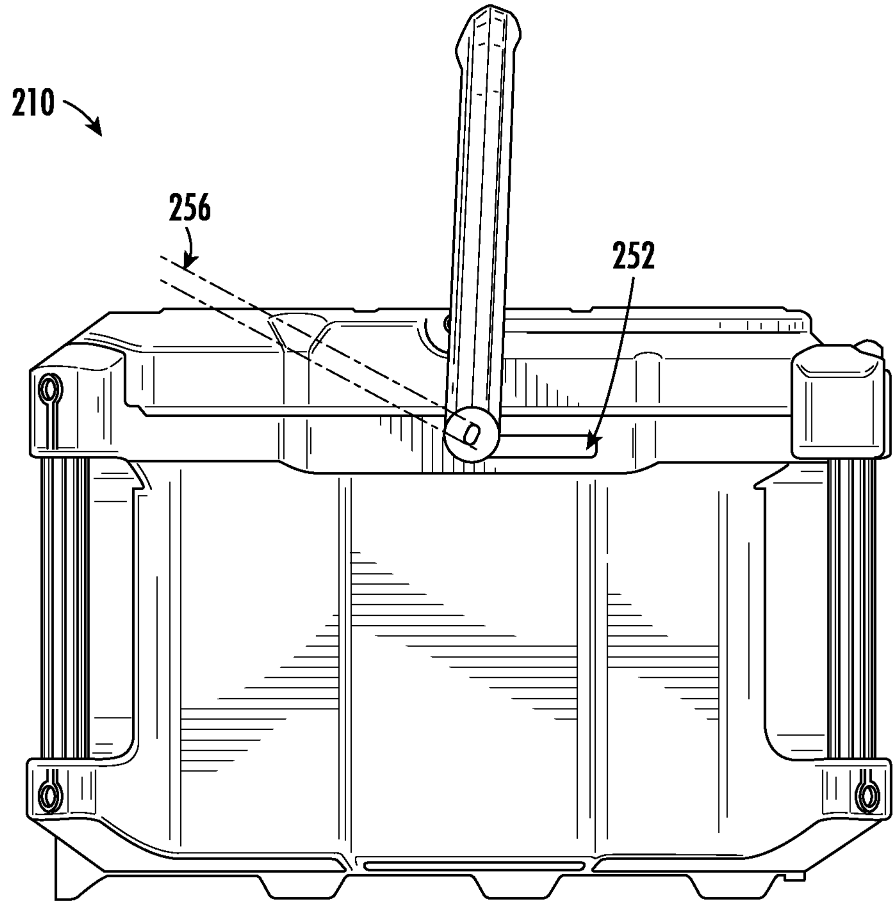
FIG. 19 is a side view of the storage unit of FIG. 15, according to an embodiment.

While pin 248 is located within shorter portion 252, the width of pin 248 is almost as long as the height of shorter portion 252. As a result, when pin 248 is located within shorter portion 252 pin 248 is restricted from rotating by walls of shorter portion 252 to range 264 of rotation (FIG. 17). In a specific embodiment, the range 264 of rotation is restricted to less than 5 degrees. In one embodiment, pin 248 is restricted from rotating because length 256 of pin 248 is greater than height 260 of shorter portion 252 (best shown FIGS. 15 and 24), and as a result pin 248 interfaces against walls of shorter portion 252. While pin 248 is located within taller portion 250, pin 248 is permitted a greater range 262 of rotation (best-shown FIG. 18) thereby allowing end 234 of handle 230 to pivot above storage unit 210. In a specific embodiment, second range 262 is degrees. In one embodiment, pin 248 is permitted a greater range 262 of rotation while pin 248 positioned in taller portion 250 than range 264 of rotation while pin 248 is positioned within shorter portion 252.

While pin 248 is located within shorter portion 252, lid 214 is permitted to rotate open from the closed position. In one embodiment, as pin 248 slides towards taller portion 250, end 234 of handle 230 interfaces against lid 214, thereby pivoting lid 214 towards the closed position.

Figure 20:
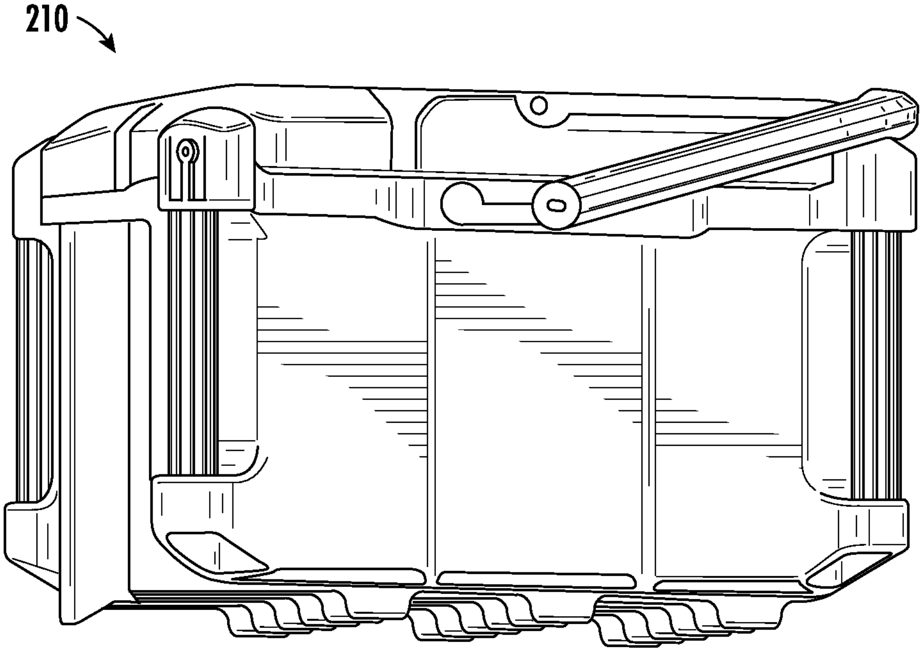
FIG. 20 is a side view of the storage unit of FIG. 15, according to an embodiment.

With reference to at least FIG. 20, in one embodiment handle 230 is pivotally coupled to housing 212 to expose one or more internal storage compartments within unit 210.

Figure 21:
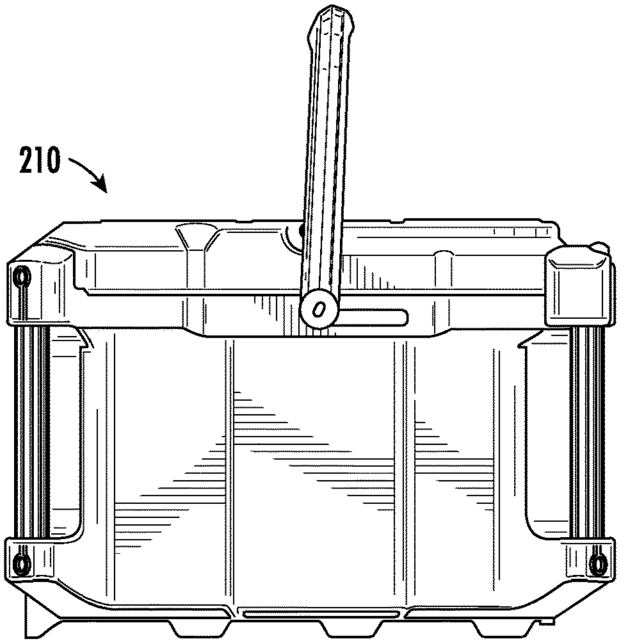
FIG. 21 is a side view of the storage unit of FIG. 15, according to an embodiment.
Figure 22:
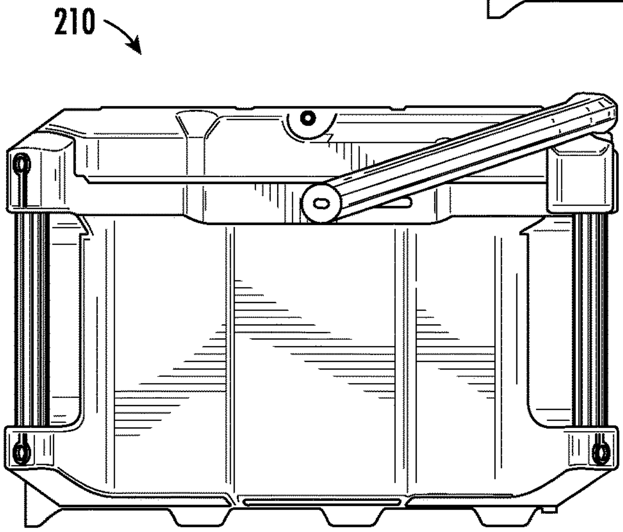
FIG. 22 is a side view of the storage unit of FIG. 15, according to an embodiment.
Figure 23:
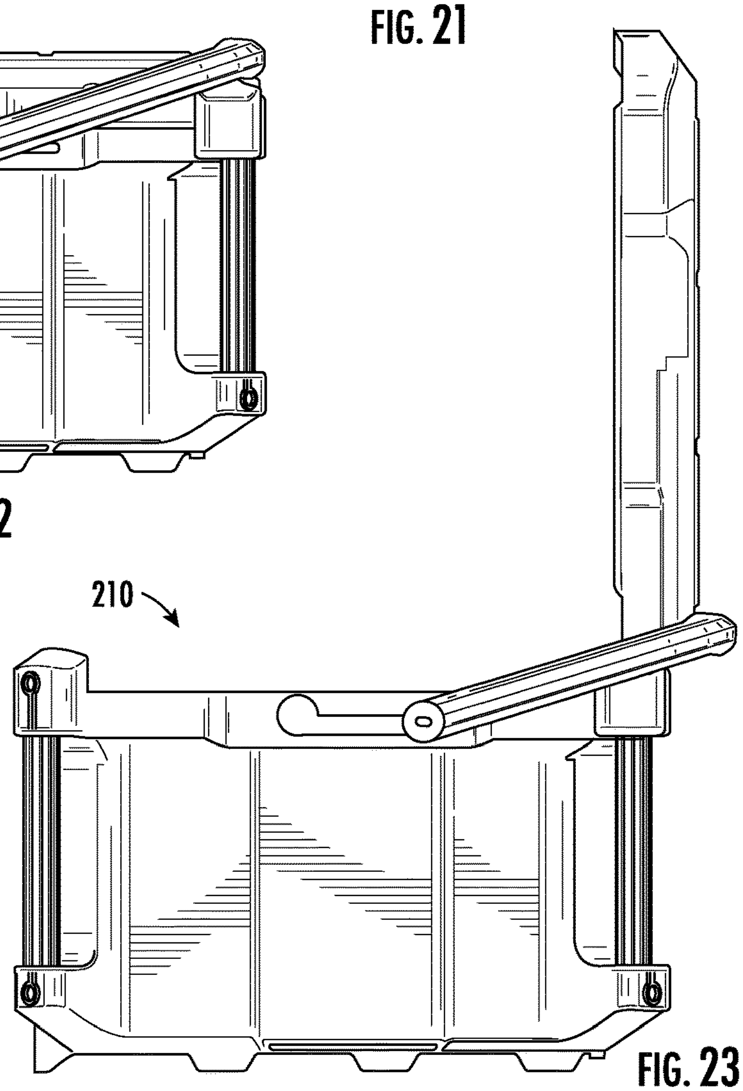
FIG. 23 is a side view of the storage unit of FIG. 15, according to an embodiment.

With reference to FIGS. 21-23, FIG. 21 is a view of storage unit 210 with end 232 of handle 230 positioned above storage unit 210, FIG. 22 is a view of storage unit 210 in the closed position, and FIG. 23 is a view of storage unit 210 in the open position.

Figure 24:
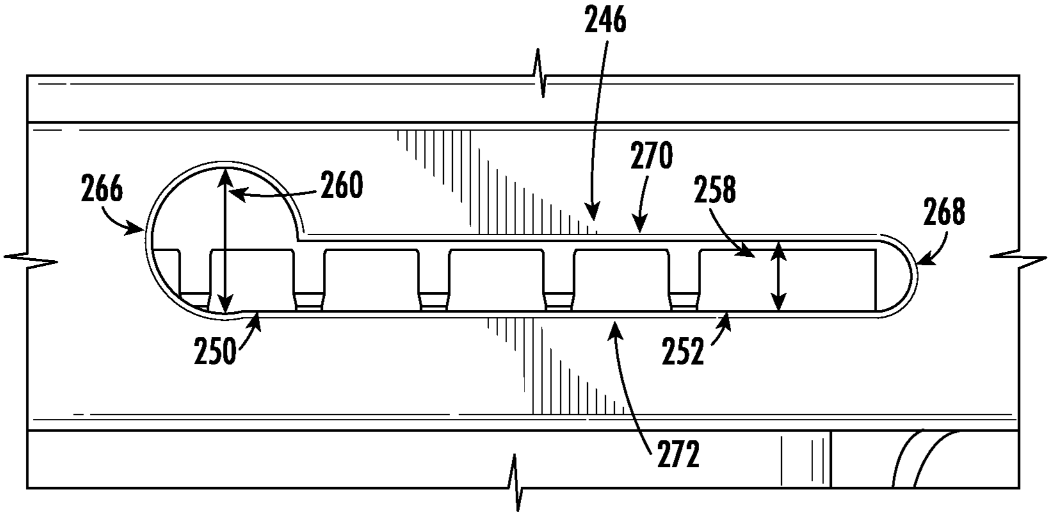
FIG. 24 is a detailed side view of the storage unit of FIG. 15, according to an embodiment.
Figure 25:
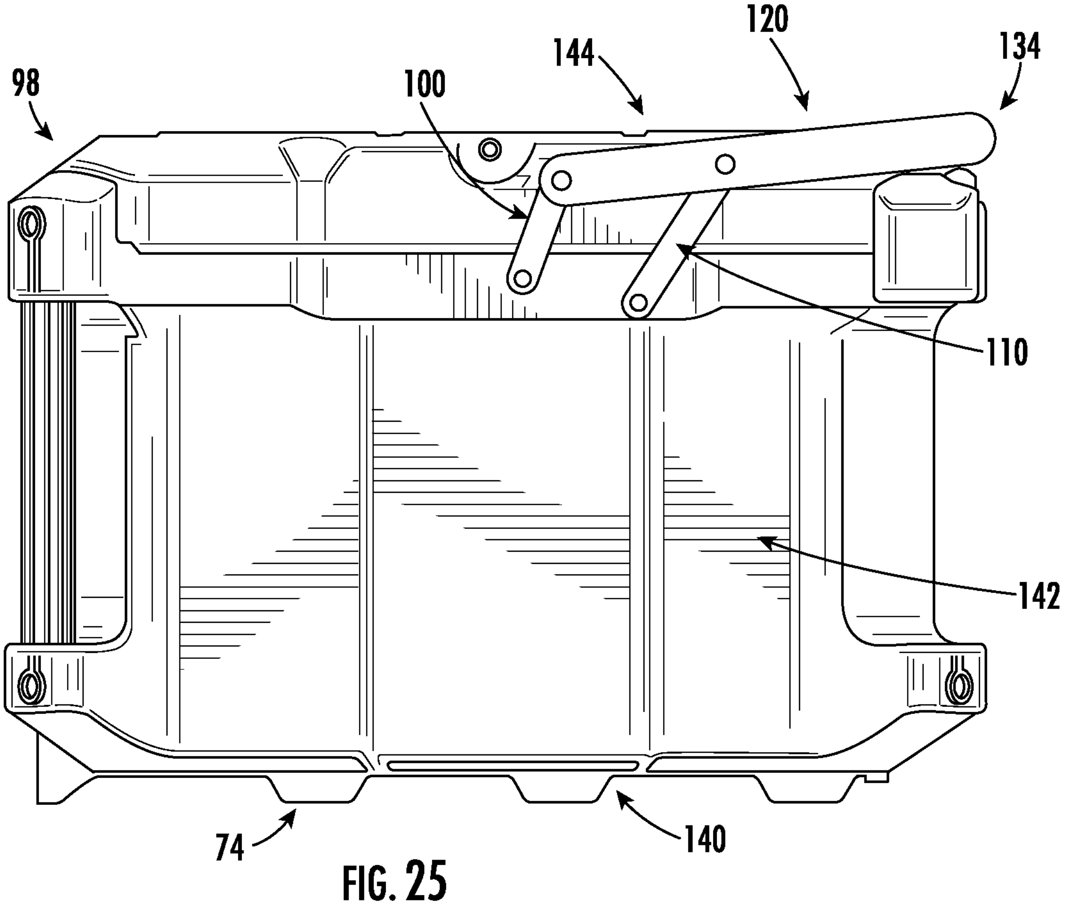
FIG. 25 is a side view of a storage unit, according to an embodiment.

Turning to FIG. 24, various aspects of slot 246 are shown. Slot 246 has a first maximum height 258 in taller portion 250 near end 266 and slot 246 has a second maximum height 260 in shorter portion 252 near end 268. The relative difference in heights between taller portion 250 and shorter portion result in pin 248 interfacing against slot 246 to provide a varying range of rotation. In a specific embodiment, pin 248 contemporaneously interfaces top surface 270 and bottom surface 272 of shorter portion 252 of slot 246 to restrict rotation of the handle to the first range of rotation. In a specific embodiment, pin 248 does not contemporaneously interface top surface 270 and bottom surface 272 of taller portion 250, thereby not restricting rotation of pin 248 within slot 246.

In a specific embodiment, maximum height 258 of taller portion 250 is at least 1.5 times maximum height 260 of shorter portion 252.

Turning to FIGS. 25-29, various aspects of tool storage unit 98 are shown. Tool storage unit 98 is substantially the same as tool storage unit 10 and tool storage unit 210 except for the differences discussed herein. Tool storage unit 98 includes base 140 and one or more lateral walls 142 that extend upwardly from base 140, such as opposing lateral walls 142 of unit 98.

Figure 26:
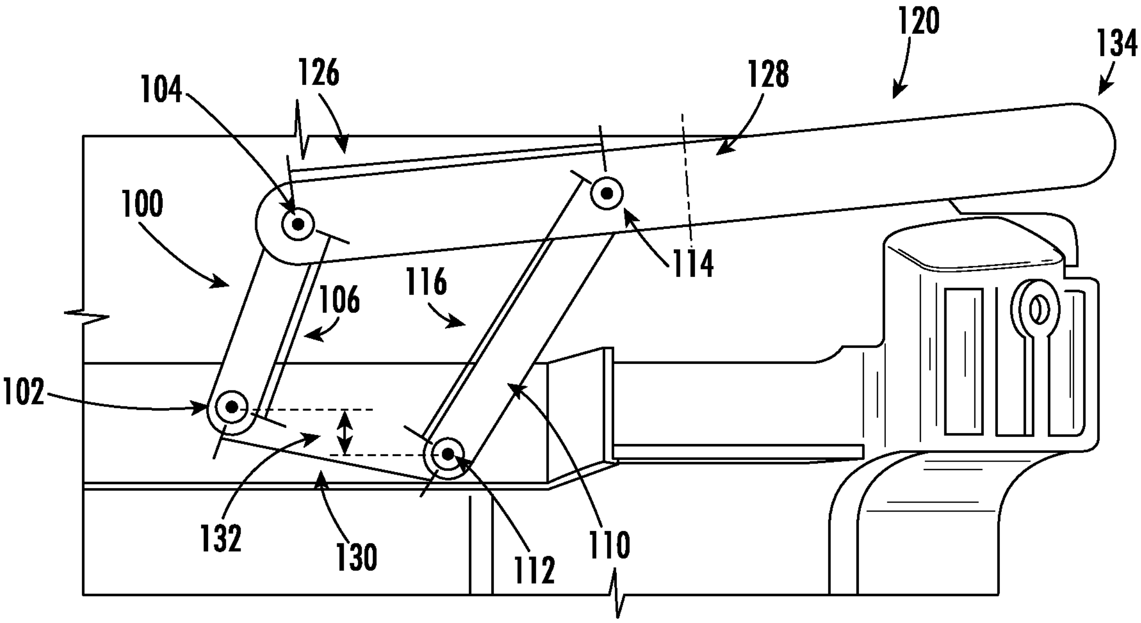
FIG. 26 is a detailed side view of the storage unit of FIG. 25, according to an embodiment.

Turning to FIG. 26 in particular, tool storage unit 98 includes a handle having four links. The first link is first handle segment 100, the second link is second handle segment 110, the third link is third handle segment 120, and the fourth link is lateral wall 142. In general, the handle segments 100, 110, 120 and 142 operate and pivot together to provide a robust handle that can be used to transport the tool storage unit 98, limit the lid from opening, and pivot to a position that allows the lid to open.

First handle segment 100 and second handle segment 110 are pivotally coupled to lateral wall 142. Third handle segment 120 is pivotally coupled to each of first handle segment 100 and second handle segment 110. First handle segment 100 pivotally rotates around axis 102 with respect to lateral wall 142, and first handle segment 100 pivotally rotates around axis 104 with respect to third handle segment 120. Second handle segment 110 pivotally rotates around axis 112 with respect to lateral wall 142, and second handle segment 110 pivotally rotates around axis 114 with respect to third handle segment 120. In a specific embodiment axis 102, axis 104, axis 112 and axis 114 are distinct (e.g., not aligned) with each other.

Second handle segment 110 is pivotally coupled to third handle segment 120 at axis 114, which is closer to middle 128 of third handle segment 120 than axis 104. In a specific embodiment, axis 114 is between axis 104 and middle 128. In another specific embodiment, middle 128 is between axis 104 and axis 114.

In a specific embodiment, first handle segment 100, second handle segment 110 and third handle segment 120 collectively define one side of handle 144. Handle 144 includes two such sides (a left-side and a right-side) that are each coupled to a lateral wall. The two such sides of handle 144 are coupled together by a distal end of handle, shown as lateral portion 134. Lateral portion 134 extends parallel to the width between opposing lateral walls 142 that the left-side and right-side of handle 144 are coupled to. As handle 144 is moved, the left-side and right-side of handle 144 generally mirror each other so the respective axes 102 are aligned, the respective axes 104 are aligned, the respective axes 112 are aligned, and the respective axes 114 are aligned.

Turning to FIG. 26 in particular, axis 102 and axis 104 are length 106 apart, axis 104 and axis 114 are length 126 apart, axis 114 and axis 112 are length 116 apart, and axis 112 and axis 102 are length 130 apart. Applicant has observed that the spatial arrangement of handle segments 100, 110, 120 and 142 as expressed by various ratios of length 106, 126 and 130 described herein provide a beneficial weight distribution through the handle that facilitates actuating the handle between different positions.

In a specific embodiment, the ratio of length 106 to length 126 is 1:4 to 2:1, specifically between 3:8 and 1.5:1, more specifically between 1:2 and 1:1, and even more specifically is 5:8.

In a specific embodiment, the ratio of length 116 to length 126 is 1:2 to 2:1, and more specifically is 1:1.5 to 1.5:1, and more specifically 1:1.2 to 1.2:1, and even more specifically is 1:1.

In a specific embodiment, the ratio of length 106 to length 116 is 1:4 to 2:1, and more specifically is 3:8 to 1.5:1, and more specifically is 1:2 to 1:1, and even more specifically is 5:8.

In a specific embodiment, the ratio of length 126 to length 130 is 1:4 to 2:1, and more specifically is 3:8 to 1.5:1, and more specifically is 1:2 to 1:1, and even more specifically is 7:10.

Figure 27:
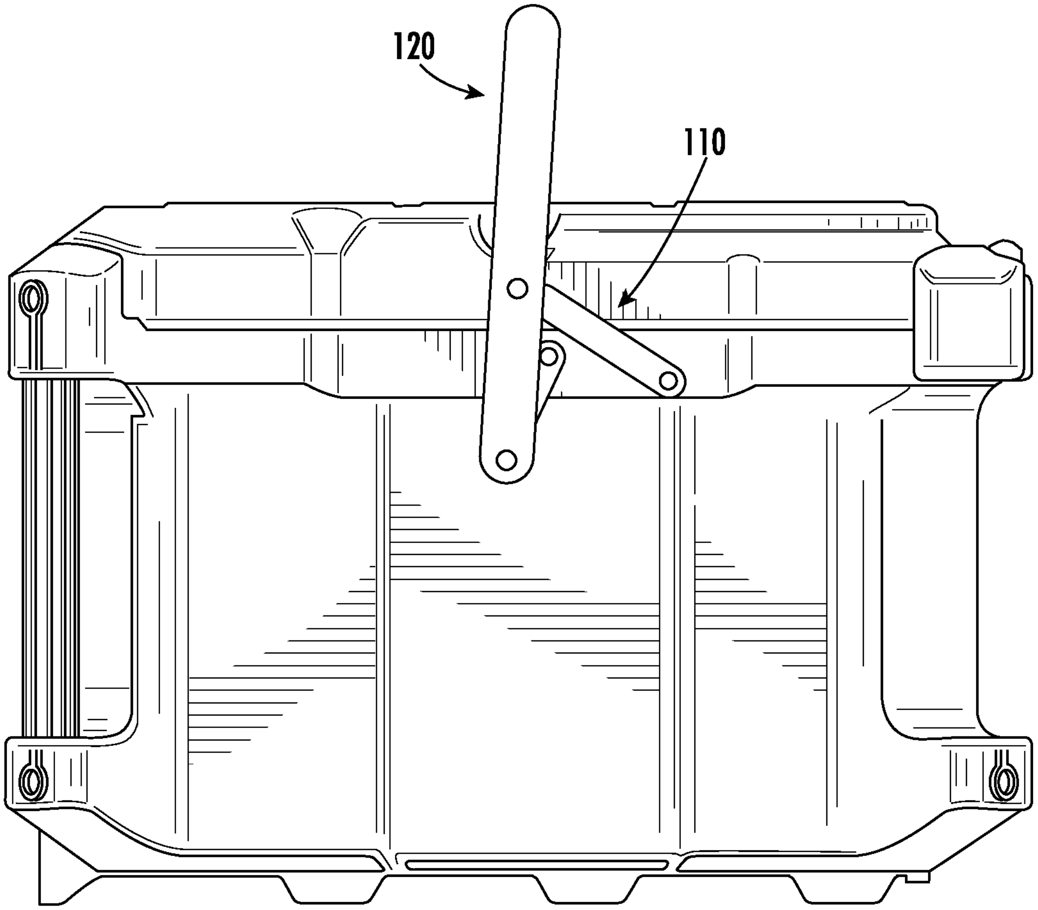
FIG. 27 is a detailed side view of the storage unit of FIG. 25, according to an embodiment.

Turning to FIG. 27, first axis 102 is positioned a vertical distance 132 above axis 112. In various embodiments, the relative lengths of handle segments 110 and 100 are related to the vertical distance 132 between axis 102 and 112. In a specific embodiment, length 116 of second handle segment 110 is greater than length 106 of first handle segment 100 by a difference. In a specific embodiment, the difference between length 116 and length 106 is 1 to 5 times distance 132, and more specifically is 1.5 to 4 times distance 132, and more specifically is 2 to 3 times distance 132, and more specifically is 2.5 times distance 132.

Figure 28:
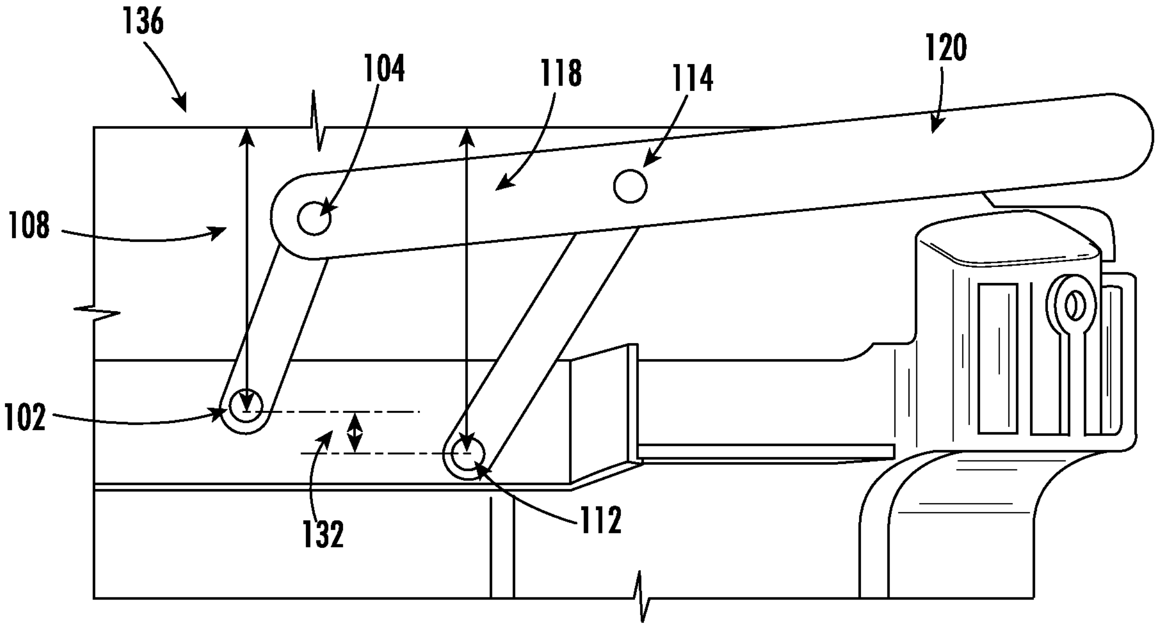
FIG. 28 is a side view of the storage unit of FIG. 25, according to an embodiment.

Turning to FIG. 28, axis 102 is distance 108 from the top of lid 136 and axis 112 is distance 118 from the top of lid 136.

Figure 29:
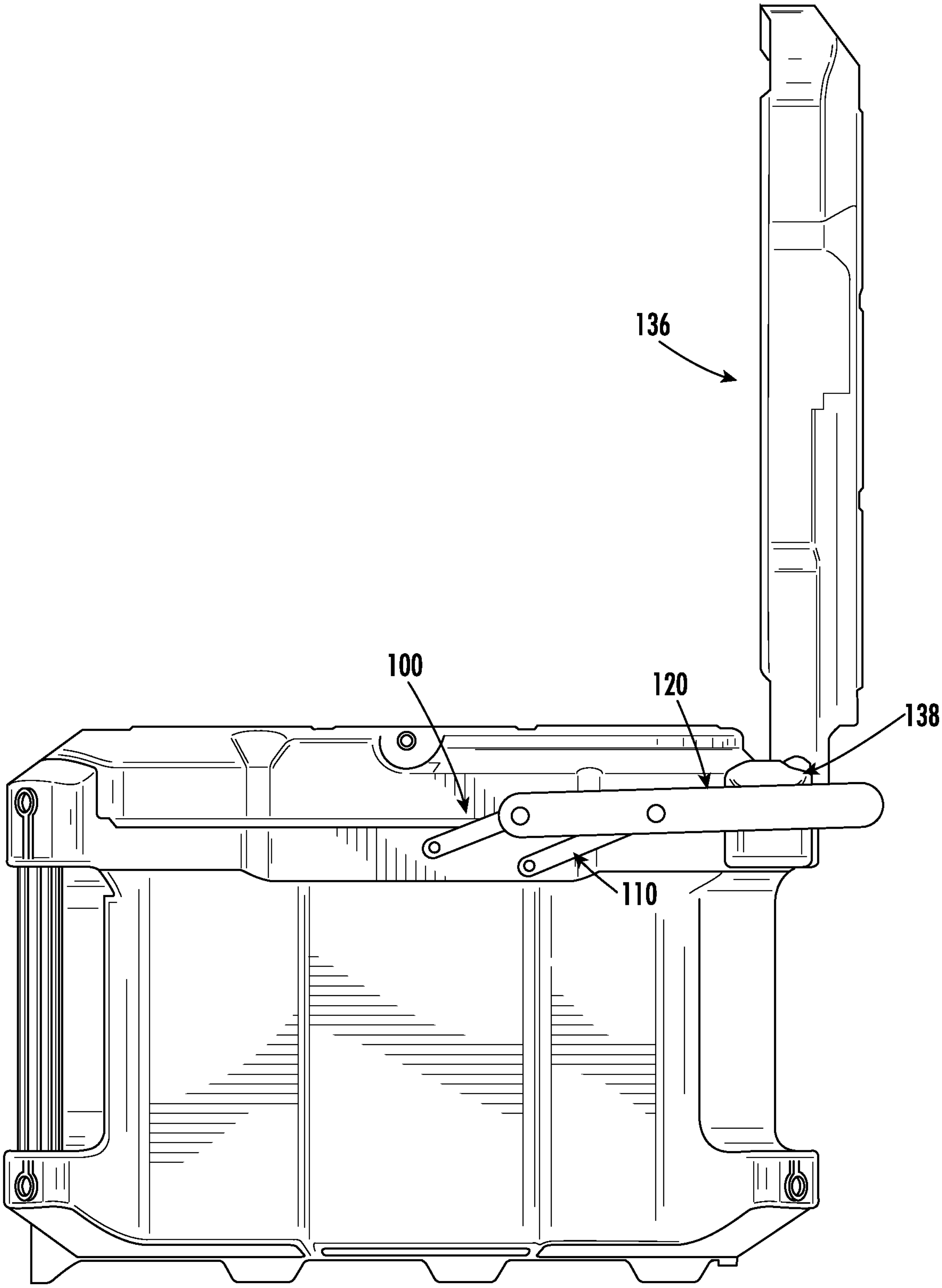
FIG. 29 is a side view of the storage unit of FIG. 25, according to an embodiment.

Turning more generally to FIGS. 27-29, handle 144 is shown in various positions. FIG. 27 depicts handle 144 in a storage position, in which third handle segment 120 is resting on lid 136. FIG. 28 depicts handle 144 in a carrying position. When handle 144 is in the carrying position, lateral portion 134 of handle 144 is at or near the furthest distance that lateral portion 134 can be positioned above lid 136. FIG. 29 depicts handle 144 in a lid opening position, in which handle 144 is positioned to permit lid 136 to be moved to the open position. In a specific embodiment lid 136 pivots around axis 138 with respect to lateral walls 142.

In a specific embodiment, the handle is restrained to one or more of the positions, such as the storing position, by a restraining mechanism, such as a detent. For example, one or more of the first handle segment 100, second handle segment 110 and third handle segment 120 may include a protrusion and/or a recession that cooperatively engage with each other to restrain the handle 144 to the then-current position. In a specific non-limiting example, the second handle segment 110 includes a protrusion that laterally extends parallel to axis 114 towards the third handle segment 120, and third handle segment 120 includes a corresponding recession that cooperatively engages with the protrusion when handle 144 is in the storing position.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A storage unit comprising:

a housing defining an internal compartment;

a pin extending from the housing, the pin defining a rotational axis;

a bottom surface defined by the housing, the bottom surface comprising coupling components that couple the bottom surface of the storage unit to a top surface of a second storage unit;

a lid pivotally coupled to the housing such that the lid is pivotable between a fully open position and a closed position covering the internal compartment;

a handle rotatably coupled to the housing via the pin, the handle rotating with respect to the housing about the rotational axis defined by the pin;

wherein the handle comprises a slot through which the pin extends, and the slot extends from a first end to a second end;

wherein, when the pin is located at the first end of the slot, a distal end of the handle opposite the slot interfaces against an upper surface of the lid when the lid is in the closed position such that the handle interferes with the lid pivoting from the closed position to the fully open position; and wherein, when the pin is located at the second end of the slot, the distal end of the handle extends past a rear of the lid such that the handle does not interface against the upper surface of the lid when the lid is in the closed position such that the handle does not interfere with the lid pivoting from the closed position.

2. The storage unit of claim 1, comprising a plurality of second coupling components defined by the upper surface of the lid, the plurality of second coupling components couple the upper surface of the storage unit to a bottom surface of a third storage unit.

3. The storage unit of claim 1, the housing comprising a front wall, a back wall, and a side wall extending between the front wall and the back wall, wherein the pin extends outward from an upper portion of the side wall, wherein the pin is below the lid when the lid is in the closed position.

* * * * *